United States Patent [19]

Skoli et al.

[11] 4,216,711

[45] Aug. 12, 1980

[54] DEOXYGENATION SYSTEM FOR PRODUCTION OF BEER

[75] Inventors: Sigmund P. Skoli; Harry G. Mojonnier, both of Chicago, Ill.

[73] Assignee: Mojonnier Bros. Co., Chicago, Ill.

[21] Appl. No.: 36,069

[22] Filed: May 5, 1979

[51] Int. Cl.² ............................................. C12G 3/04
[52] U.S. Cl. ................................. 99/277.2; 99/323.1; 55/223; 426/477; 426/487
[58] Field of Search ............... 99/275, 276, 277, 277.1, 99/277.2, 323.1, 323.2; 435/161; 426/477, 487, 488; 55/223, 244; 261/103, 106

[56] References Cited

U.S. PATENT DOCUMENTS

| 2,117,604 | 5/1938 | Fessler | 99/277.1 |
| 3,780,198 | 12/1973 | Pahl | 99/275 |
| 3,807,143 | 4/1974 | Dunn | 55/223 |
| 3,960,066 | 6/1976 | Knorr | 99/323.2 |
| 4,112,828 | 9/1978 | Mojonnier | 426/477 |

Primary Examiner—Robert W. Jenkins
Attorney, Agent, or Firm—Trexler, Wolters, Bushnell & Fosse

[57] ABSTRACT

A system is disclosed for producing beer and like extensively deaerated beverages. The system includes a deoxygenating column, a remote source of heavy beer, and a proportioner unit connected to receive deoxygenated water and heavy beer. After the water and heavy beer are mixed in the proportioner, the formed bright beer is exhausted. Water entering the system is routed to a deaeration column, which includes a fluid exhaust pump unit bottom, and at least one deoxygenating unit module mounted atop the pump unit.

14 Claims, 3 Drawing Figures

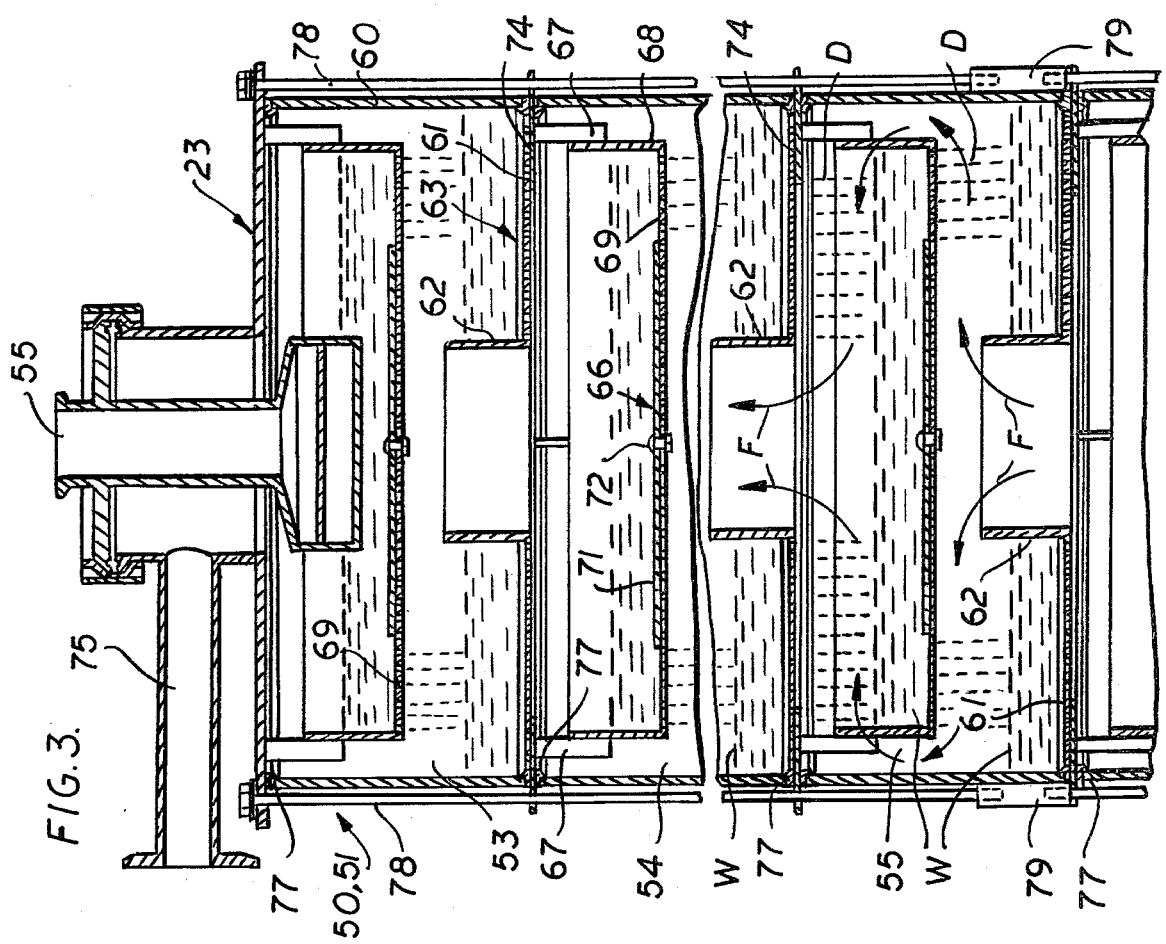

DEOXYGENATION SYSTEM FOR PRODUCTION OF BEER

DESCRIPTION OF THE INVENTION

This invention relates generally to beer manufacturing systems, and more particularly concerns a system for producing beer at an economical cost and on a continual basis.

A common, modern method of manufacturing beer calls for a beer concentrate, called heavy beer, to be combined with deoxygenated water to form an end product called bright beer. Experience has shown that deoxygenated water is required to improve beer stability during preparation and the filling process, and during storage prior to consumption. Thus, modern beer preparation systems must provide for the deaeration of water to reduce air contained within the water to amounts on the order of a few parts per billion.

While soft drink apparatus and other devices can be used to reduce air contained within water to amounts on the order of a few parts per million, the air content must be reduced to a considerably lower level if the water is to be used in preparation or brewing of beer. In beer preparation, presence of air in a ratio of more than a very few parts per billion can result in an unacceptable end product. Previously, this deoxygenating was accomplished over an extended period of time in complex, expensive bubbling tanks. This deoxygenation was accomplished on a discrete amount, or batch, basis; and the beer production system required complex controls to introduce batches of deoxygenated water to downstream parts of the system on a continuous-flow basis.

It is accordingly the general object of the present invention to provide a system which will combine a beer concentrate, or heavy beer, with deoxygenated water to form a bright beer for storage, filling, or later operations, and which will permit these operations to be accomplished on a continuous basis.

Another object is to provide such a system which permits the replacement of heretofore-used bubbling tanks and previously-required extended water treating times. Such water treating times can be reduced from the previously-required two weeks or more to a water treating time of minutes or seconds.

Yet another object is to provide a system which is compact so as to save floor space and require less equipment of the beer manufacturer.

Yet another object is to provide a system which requires reduced maintenance due to its reduced complexity.

A still further object is to provide a beer production system which is automated to an increased degree.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 2 is an elevational side view showing the deoxygenating column illustrated in the diagram of FIG. 1; and FIG. 3 is a fragmentary sectional view showing the interior of the top portion of the deoxygenating column shown in FIG. 2.

DETAILED DESCRIPTION

Figure 1:
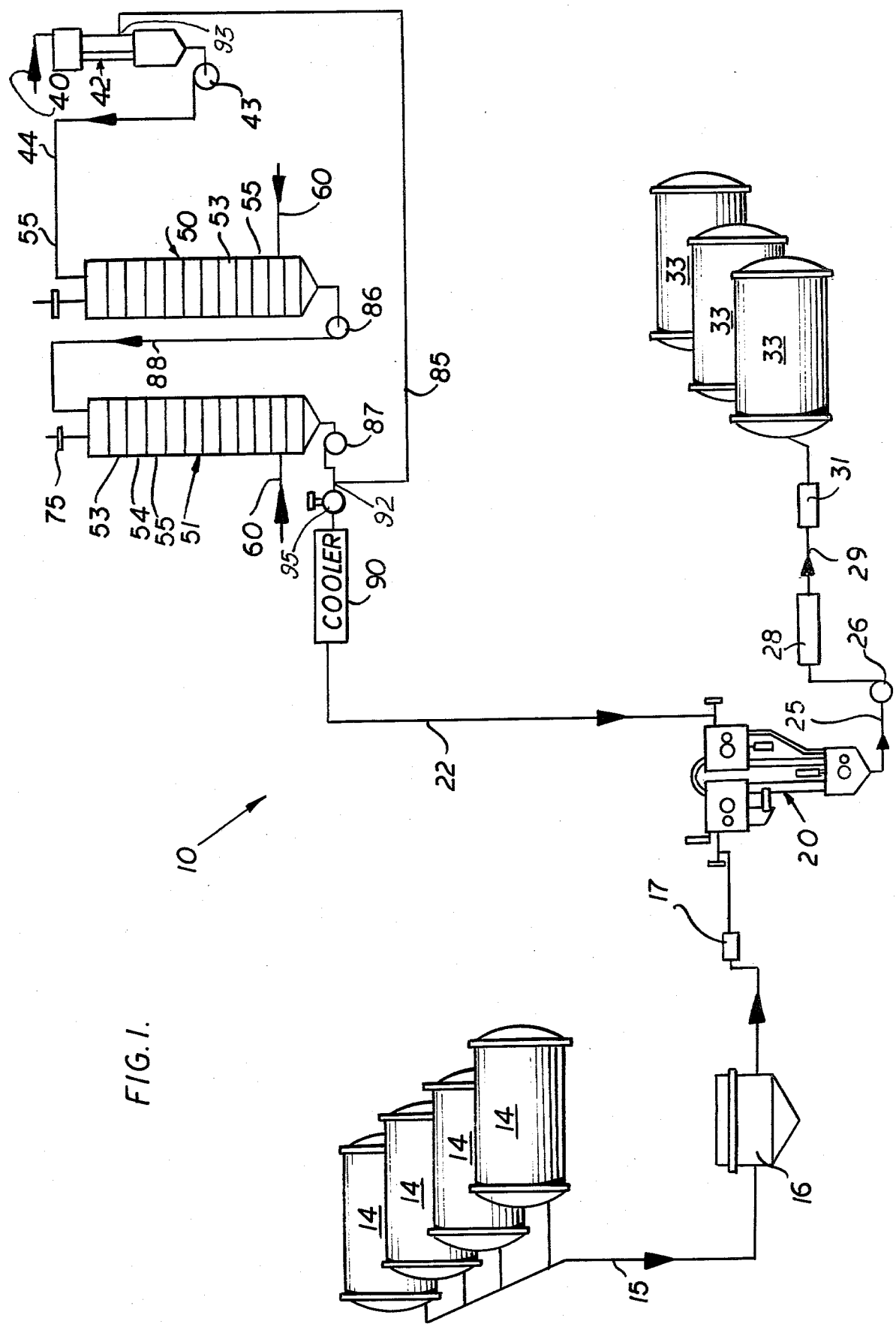
FIG. 1 is a diagram showing, in somewhat schematic form, a system embodying the present invention for preparing a bright beer product from water and a heavy beer concentrate.

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning more specifically to the drawing, there is shown a system 10 for producing a bright beer end product by combining a heavy beer concentrate and a source of properly prepared water. Here, previously-prepared heavy beer concentrate can be stored in one or more tanks 14 and routed by appropriate piping 15 through a filter 16 and a regulator 17 to a proportioner unit 20. In accordance with a broad aspect of the invention, deaerated water is continuously routed, by appropriate transfer piping 22, to the proportioner 20 where the heavy beer and deaerated water are continuously mixed within the proportioner 20 in preselected proportions to form bright beer. The mixed heavy beer and water are drawn by exhaust piping 25 and a pump 26 from the proportioner 20. A carbonator unit 28 carbonates the mixture, and downstream piping 29 routes the carbonated mixture through a flow meter 31 to appropriate storage tanks 33, bottle fillers (not shown) or other devices.

Water for the proportioner 20 enters the system from a remote water source 40. Here, the rate of water flow into the system is controlled by a pacing or flow metering unit 42. An appropriate exhaust pump 43 and downstream piping 44 deliver this metered flow of water to the first of two deoxygenating columns 50 and 51. A deoxygenating column of this type is disclosed and claimed in U.S. application Ser. No. 871,539 filed Jan. 23, 1978. As shown in FIGS. 2 and 3, each of these columns 50 and 51 includes a pump unit bottom 52 and one or more deoxygenating unit modules 53, 54 and 55. The number of columns 50 and 51 themselves, and the number of modules 53-55 mounted atop each column pump unit 52, is determined by the amount of deoxygenating to be accomplished, and by the amount of space available between the column site floor or foundation and any overhead obstructions.

Water is introduced to each unit 50 and 51 through a top inlet 55 and, generally speaking, falls downwardly through the unit to the exhaust pump module 52. Carbon dioxide gas is introduced through a metering device 60 from a remote source and flows generally upwardly to the column top 56. This counter-flow arrangement encourages highly effective removal of air and oxygen from the water, and its replacement by carbon dioxide gas.

More specifically, to accomplish this highly effective deaeration in accordance with this aspect of the invention, each deaeration unit module 53-55 includes an outer wall 60 and a foraminous baffle sheet 61 extending inwardly from that wall 60 as shown in FIG. 3. A stack member 62, here centrally located, extends upwardly from the baffle sheet 61. Together, the wall 60, sheet 61 and stack 62 form an annular, foraminous-bottomed retainer 63 for temporarily retaining a continuous layer or quantity of the water W which is being deaerated. It will be understood that this layer of water W is not quiescent, but it is dynamically stable; that is, water falls into the retainer 63 and water layer W from upper parts of the column at substantially the same rate as water is lost from the layer W through the bottom sheet 61.

Below each sheet 61 and stack 62, a basin 66 is mounted, as upon depending legs 67. This basin 66, located inside the outer unit wall 60, is here defined by an annular outer basin wall 68 and a foraminous bottom sheet member 69 for temporarily retaining liquid falling from the baffle sheet 61 located immediately above that basin. Again, the basin 66 contains a continuous layer or quantity of water W, and is substantially dynamically stable.

To adjust the effective open area of the basin bottom sheet 69 and to prohibit liquid from falling directly to and through the stack member below the basin 66, a mask plate 71 is secured, as by a bolt 72 or other convenient means, over the central portion of the basin foraminous bottom 69. An annular mask sheet 74 is secured about the outer periphery of the retainer bottom sheet 61. By adjusting the size of these mask sheets 71 and 74 in relation to the associated foraminous sheets 61 and 69, the volume and rate of water being processed by the column can be correspondingly adjusted.

As shown particularly in FIG. 3, carbon dioxide gas, which has been introduced into the bottommost or pump unit module 52 through the meter 60, is exhausted through a carbon dioxide exhaust outlet pipe 75 mounted atop the unit. Thus, as the carbon dioxide gas flows upwardly through the unit 50 or 51, it is forced by the solid layers of water W—which are in alternating, extended annular and compact, non-annular array—to follow a serpentine path as illustrated by the arrows F in FIG. 3. Moreover, as the gas passes upwardly in this serpentine path, the gas passes through vertically-stacked or arrayed curtains of falling, finely-divided water droplets D. This close, intermittent intermixing of upwardly-rising carbon dioxide gas and the downwardly-falling water provides extensive gas-water intermixing. The extensive gas-water intermixing provides, in turn, virtually complete exchange of carbon dioxide gas for the oxygen-containing air previously dissolved within the water. Moreover, as the water falls downwardly through the unit and approaches the bottom water-exhausting pump unit 52, and the carbon dioxide inlet 60, the water is subject to ever-purer concentrations of carbon dioxide gas. Oxygen replacement with carbon dioxide is yet further encouraged by operating the column at positive pressure on the order of 4–5 p.s.i.g., for example.

As illustrated in FIG. 3, these deaeration unit modules 53, 54, and 55 can be stacked atop one another and interconnected, as by interconnector rods 78 and couplings 79, to provide the desired column rigidity and provide the desired deaeration effect. Gaskets 77 insure water- and gas-tight seals between column modules.

To further control the water flowing to the deoxygenating or deaerating columns 50, 51, switches can be provided on the pump module 52. A first switch 80 provides a low level control to halt operation of the pump moldule 52 and thereby permit the water level to rise within the column 50, 51. A second switch 81 can be used to direct deoxygenated water away from the downstream portions of the system shown in FIG. 1 and to other apparatus such as a filter for use in filter washing. A third switch 82 and valve 95 can be used as a high level control so as to operate a recirculation line 85 (FIG. 1) and route water from the deoxygenating column 51 back to the flow meter 42 if the demand for water by the downstream proportioner 20 is reduced for any reason. This recirculation line is, as illustrated, connected at a first end 92 to the column-to-proportioner transfer line 22 at a point downstream of the columns 50, 51 and upstream of the proportioner 22. At a second end 93, the line 85 is connected to the system 10 at a point upstream of the columns 50, 51. Here, this second connecting point is made at the flow meter 42 to encourage water flow stability. This recirculating line 85 also permits water to be continuously routed through the deoxygenating columns 50, 51 so as to deoxygenate the water to a predetermined extent before releasing the water downstream. Motor and pump units 86, 87 are provided to draw off the water from the columns.

In accordance with another aspect of the invention, it is possible to provide additional deaeration capability for the system by including a second deaeration column 51 downstream of and in series with the first deaeration column 50. That is, water collected by the exhaust pump bottom unit 86 of the first deaeration column 50 can be routed by an interconnector line 88 to the top water inlet of the second deaeration column 51 for further deaeration action. After the deaerated water is collected by the final pump 87, it can be passed through a cooler 90 before entering the transfer line 22.

The invention is claimed as follows:

1. A system for producing beer and like extensively deaerated beverages, comprising, in combination, deoxygenating column means connected to a remote source of water, the column means including a fluid exhaust pump unit bottom, at least one deoxygenating unit mounted atop the pump unit, the deoxygenating unit including an outer unit wall, a foraminous baffle sheet extending inwardly from the wall, and a stack member extending upwardly from the baffle sheet, the wall, sheet and stack together forming a foraminous-bottom retainer for temporarily retaining water, the retained water forming a first gas barrier, and the water falling from the foraminous sheet being brought into first intimate contact with upwardly flowing gas, the system further including a remote source of heavy beer, a proportioner unit connected to the deoxytenating column means to receive deoxygenated water from the column means, the proportioner also being connected to receive heavy beer from the heavy beer source, the proportioner including means for mixing the heavy beer and the deoxygenated water in preselected proportions to form bright beer, and exhaust line means for carrying the mixed bright beer away from the proportioner.

2. A system according to claim 1 wherein said deoxygenating unit further includes a basin mounted below the retainer baffle sheet and stack, the basin having a foraminous basin bottom for temporarily retaining water falling from the baffle sheet above and forming a second gas barrier, and the water falling from the foraminous basing bottom being brought into second intimate contact with the upwardly flowing gas.

3. A system according to claim 1 or claim 2 wherein said deoxygenating column means includes at least a first and a second deoxygenating column connected in series.

4. A system according to claim 3 including an interconnector line means connected between the first deoxygenating column exhaust pump bottom and a top water inlet on the second deoxygenating column.

5. A system according to claim 1 or claim 2 including column-to-proportioner transfer line means for transferring water from the deoxygenating column means to said proportioner and recirculating line means connected, at a first recirculating line end, to the column-to-proportioner line means at a point downstream of the deoxygenating column and upstream of the proportioner, and at a second recirculating line end to a system point upstream of the deoxygenating column means, and valve means for permitting water to be continuously routed through the deoxygenating column means, whereby to deoxygenate the water to a predetermined extent before releasing the water to downstream portions of the system.

6. A system according to claim 1 or claim 2 including water flow control means connected between the water source and the deoxygenating column for providing an even flow of water to the deoxygenating column.

7. A system according to claim 1 or claim 2 including cooler means interposed between the deoxygenating column means and the proportioner in the transfer line means.

8. A system according to claim 1 including filter means interposed between the source of heavy beer and the proportioner.

9. A system according to claim 1 including carbonator means interposed in the exhaust line means downstream of the proportioner for carbonating the mixed heavy beer and water to form a carbonated bright beer end product.

10. A system for producing beer and the like, comprising, in combination, water flow control means for providing an even flow of water, a gas-exchange deaerating column connected to the water flow control means for receiving water therefrom, the deaerating column comprising a fluid exhaust pump unit bottom and at least one deoxygenating unit module mounted atop the pump unit, the deoxygenating unit module including a basin having a foraminous bottom for temporarily retaining liquid falling from the retainer baffle sheet above, the system further including a source of heavy beer, and a proportioner connected to the deoxygenating column for receiving deoxygenated water therefrom and to the heavy beer source for receiving heavy beer therefrom, the proportioner including means for mixing the heavy beer and the deoxygenated water.

11. A system according to claim 10 including a second deoxygenating column functionally interposed in the system between the first-mentioned deoxygenating column and said proportioner.

12. A system according to claim 11 including inter-column transfer line means connected between the fluid exhaust pump bottom of the first column and a top water inlet on the second column.

13. A system according to claim 10 including column-to-proportioner transfer line means for transferring water from said deoxygenating column to the proportioner and recirculating line means connected, at a first recirculating line end, to the column-to-proportioner line means at a first point downstream of the deoxygenating column and upstream of the proportioner, and at a second recirculating line end to a system point upstream of the deoxygenating column, and valve means for permitting water to be continuously recirculated through the deoxygenating column means, whereby to deoxygenate the recirculating water to a predetermined extent before releasing the water to downstream portions of the system.

14. A system according to claim 10 including cooler means interposed between the deoxygenating column and the proportioner.

* * * * *